US012129766B2

(12) United States Patent
Yang et al.

(10) Patent No.: US 12,129,766 B2
(45) Date of Patent: Oct. 29, 2024

(54) VERTICAL JOINT COUPLING STRUCTURE OF CASING, AND GAS TURBINE HAVING SAME

(71) Applicant: DOOSAN ENERBILITY CO., LTD, Changwon-si (KR)

(72) Inventors: Young Chan Yang, Changwon-si (KR); Dong Wook Lee, Changwon-si (KR)

(73) Assignee: DOOSAN ENERBILITY CO., LTD., Changwon-si (KR)

( * ) Notice: Subject to any disclaimer, the term of this patent is extended or adjusted under 35 U.S.C. 154(b) by 12 days.

(21) Appl. No.: 18/113,791

(22) Filed: Feb. 24, 2023

(65) Prior Publication Data

US 2023/0265770 A1 Aug. 24, 2023

(30) Foreign Application Priority Data

Feb. 23, 2022 (KR) ........................ 10-2022-0023381

(51) Int. Cl.
*F01D 25/26* (2006.01)

(52) U.S. Cl.
CPC ........ *F01D 25/265* (2013.01); *F05D 2260/30* (2013.01)

(58) Field of Classification Search
CPC ...... F01D 25/265; F01D 25/26; F01D 25/243; F01D 25/28; F01D 25/30; F01D 25/246; F01D 25/285; F01D 25/24; F05D 2260/30
See application file for complete search history.

(56) References Cited

U.S. PATENT DOCUMENTS

| | | | | |
|---|---|---|---|---|
| 8,465,254 | B2 * | 6/2013 | Swart | F01D 25/243 415/214.1 |
| 2010/0083499 | A1 | 4/2010 | Shigemoto et al. | |
| 2013/0011253 | A1 * | 1/2013 | Mulcaire | F01D 25/265 415/214.1 |
| 2016/0208652 | A1 | 7/2016 | Rogers et al. | |
| 2016/0363004 | A1 | 12/2016 | Chow et al. | |
| 2017/0089264 | A1 * | 3/2017 | Jones | F02C 7/185 |
| 2020/0011366 | A1 * | 1/2020 | Hanson | F01D 25/246 |

(Continued)

FOREIGN PATENT DOCUMENTS

| | | | |
|---|---|---|---|
| FR | 3074215 | A1 | 5/2019 |
| JP | 2007189576 | A1 | 7/2007 |
| JP | 2012281914 | A1 | 12/2012 |

(Continued)

OTHER PUBLICATIONS

European Search Report Dated May 19, 2023 in corresponding European Application No. 23157252, 10 Pages.

*Primary Examiner* — Thomas P Burke
(74) *Attorney, Agent, or Firm* — Shook, Hardy & Bacon L.L.P.

(57) ABSTRACT

A vertical joint coupling structure includes a first casing in which combustion gases flow, a second casing connected to the first casing, a vertical joint mounted on the second casing and coupled to the first casing, a plurality of bolt fasteners fastened to the vertical joint and the first casing, a plurality of jacking screws inserted into the vertical joint to secure a gap between the vertical joint and the first casing upon disassembly or assembly between the first casing and the second casing, and a shim member inserted into the gap between the vertical joint and the first casing.

8 Claims, 5 Drawing Sheets

(56) References Cited

U.S. PATENT DOCUMENTS

2021/0285340 A1 9/2021 Lee et al.

FOREIGN PATENT DOCUMENTS

| | | | |
|---|---|---|---|
| KR | 20190007954 | A1 | 1/2019 |
| KR | 20200117167 | B1 | 9/2020 |
| KR | 1020150110934 | B1 | 5/2021 |
| KR | 10-2021-0115580 | | 9/2021 |
| WO | 2011/151329 | A1 | 12/2011 |
| WO | WO2020040720 | A1 | 2/2020 |

* cited by examiner

VERTICAL JOINT COUPLING STRUCTURE OF CASING, AND GAS TURBINE HAVING SAME

CROSS REFERENCE TO RELATED APPLICATION

The present application claims priority to Korean Patent Application No. 10-2022-0023381, filed on Feb. 23, 2022, the entire contents of which are incorporated herein for all purposes by this reference.

BACKGROUND OF THE INVENTION

1. Field of the Invention

The present disclosure relates to a vertical joint coupling structure of a casing, and a gas turbine including the same. More particularly, the present disclosure relates to a vertical joint coupling structure of a casing that can be easily disassembled and assembled without a hydraulic jack and an additional jig by securing a gap between a first casing and a vertical joint mounted on a second casing by using a jacking screw, and a gas turbine including the same.

2. Description of the Background Art

A turbine is a mechanical device that obtains a rotational force by an impulsive force or reaction force using a flow of a compressible fluid such as steam or gas. The turbine includes a steam turbine using a steam and a gas turbine using a high temperature combustion gas.

Among them, the gas turbine is mainly composed of a compressor, a combustor, and a turbine. The compressor is provided with an air inlet for introducing air, and a plurality of compressor vanes and compressor blades, which are alternately arranged in a compressor housing.

The combustor supplies fuel to the compressed air compressed in the compressor and ignites a fuel-air mixture with a burner to produce a high temperature and high pressure combustion gas.

The turbine has a plurality of turbine vanes and turbine blades disposed alternately in a turbine housing. Further, a rotor is arranged to pass through the center of the compressor, the combustor, the turbine and an exhaust chamber.

Both ends of the rotor are rotatably supported by bearings. A plurality of disks are fixed to the rotor so that respective blades connected to the disks are connected and drive the rotor from the energy extracted from the high temperature and high pressure combustion gas. The rotor may be connected to a drive shaft of a load device, such as a generator, that is connected near an end of the exhaust chamber.

Since these gas turbines have no reciprocating mechanism such as a piston in a 4-stroke engine, so that there are no mutual frictional parts like piston-cylinder, the gas turbines have advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, which is then injected toward the turbine. The injected combustion gas passes through the turbine vanes and the turbine blades to generate a rotational force, which causes the rotor to rotate.

On the other hand, in such a gas turbine, a plurality of casings is coupled to each other, and a hydraulic jack is used to secure a gap required to disassemble or assemble vertical joints between two casings. However, the use of a high-pressure hydraulic jack causes a safety problem as well as another problem in that additional hydraulic equipment, jigs, and attachments are required, and the work is cumbersome and time-consuming.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a vertical joint coupling structure of a casing that can be easily disassembled and assembled without a hydraulic jack and an additional jig by securing a gap between a first casing and a vertical joint mounted on a second casing by using a jacking screw, and a gas turbine including the same.

In an aspect of the present disclosure, there is provided a vertical joint coupling structure including: a first casing in which combustion gases flow; a second casing connected to the first casing; a vertical joint mounted on the second casing and coupled to the first casing; a plurality of bolt fasteners fastened to the vertical joint and the first casing; a plurality of jacking screws inserted into the vertical joint to secure a gap between the vertical joint and the first casing upon disassembly or assembly between the first casing and the second casing; and a shim member inserted into the gap between the vertical joint and the first casing.

The vertical joint may include a hub part having a cylindrical shape, a plurality of rib connector parts extending radially from an outer circumferential surface of the hub part, and a plurality of joint parts integrally formed on distal ends of the rib connector parts, respectively, and coupled to the second casing.

The vertical joint may further include a plurality of link members disposed on an outer circumferential surface of the second casing and coupled between distal ends of the rib connector parts.

Each of the link member may include a pair of flange parts respectively fastened to opposite lateral sides of the distal ends of adjacent rib connector parts, and a plurality of circumferential rib parts integrally connected between the pair of flange parts.

The shim member may include a plurality of through holes through which the bolt fasteners pass, and a plurality of screw slots extending from an edge thereof so that the jacking screws pass therethrough.

The first casing may include a body part having a circular pipe shape with a variable diameter, and a flange part extending radially from an end of the body part.

The shim member may be inserted and mounted between the flange part and the joint part.

The first casing may be a turbine casing disposed downstream of a turbine, and the second casing may be a diffuser.

In another aspect of the present disclosure, there is provided a gas turbine including, a compressor suctioning and compressing external air, a combustor mixing fuel with compressed air and combusting an air-fuel mixture, and a turbine rotated by combustion gases discharged from the combustor, the turbine including: a first casing in which combustion gases flow; a second casing connected to the first casing; a vertical joint mounted on the second casing and coupled to the first casing; a plurality of bolt fasteners fastened to the vertical joint and the first casing; a plurality of jacking screws inserted into the vertical joint to secure a gap between the vertical joint and the first casing upon disassembly or assembly between the first casing and the second casing; and a shim member inserted into the gap between the vertical joint and the first casing.

The vertical joint may include a hub part having a cylindrical shape, a plurality of rib connector parts extending radially from an outer circumferential surface of the hub part, and a plurality of joint parts integrally formed on distal ends of the rib connector parts, respectively, and coupled to the second casing.

The vertical joint may further include a plurality of link members disposed on an outer circumferential surface of the second casing and coupled between distal ends of the rib connector parts.

Each of the link member may include a pair of flange parts respectively fastened to opposite lateral sides of the distal ends of adjacent rib connector parts, and a plurality of circumferential rib parts integrally connected between the pair of flange parts.

The shim member may include a plurality of through holes through which the bolt fasteners pass, and a plurality of screw slots extending from an edge thereof so that the jacking screws pass therethrough.

The first casing may include a body part having a circular pipe shape with a variable diameter, and a flange part extending radially from an end of the body part.

The shim member may be inserted and mounted between the flange part and the joint part.

The first casing may be a turbine casing disposed downstream of a turbine, and the second casing may be a diffuser.

According to the vertical joint coupling structure of the casing and the gas turbine including the same, the vertical joint can be easily disassembled and assembled without a hydraulic jack and an additional jig by securing a gap between the first casing and the vertical joint mounted on the second casing by using the jacking screw.

DETAILED DESCRIPTION OF THE INVENTION

Figure 1:
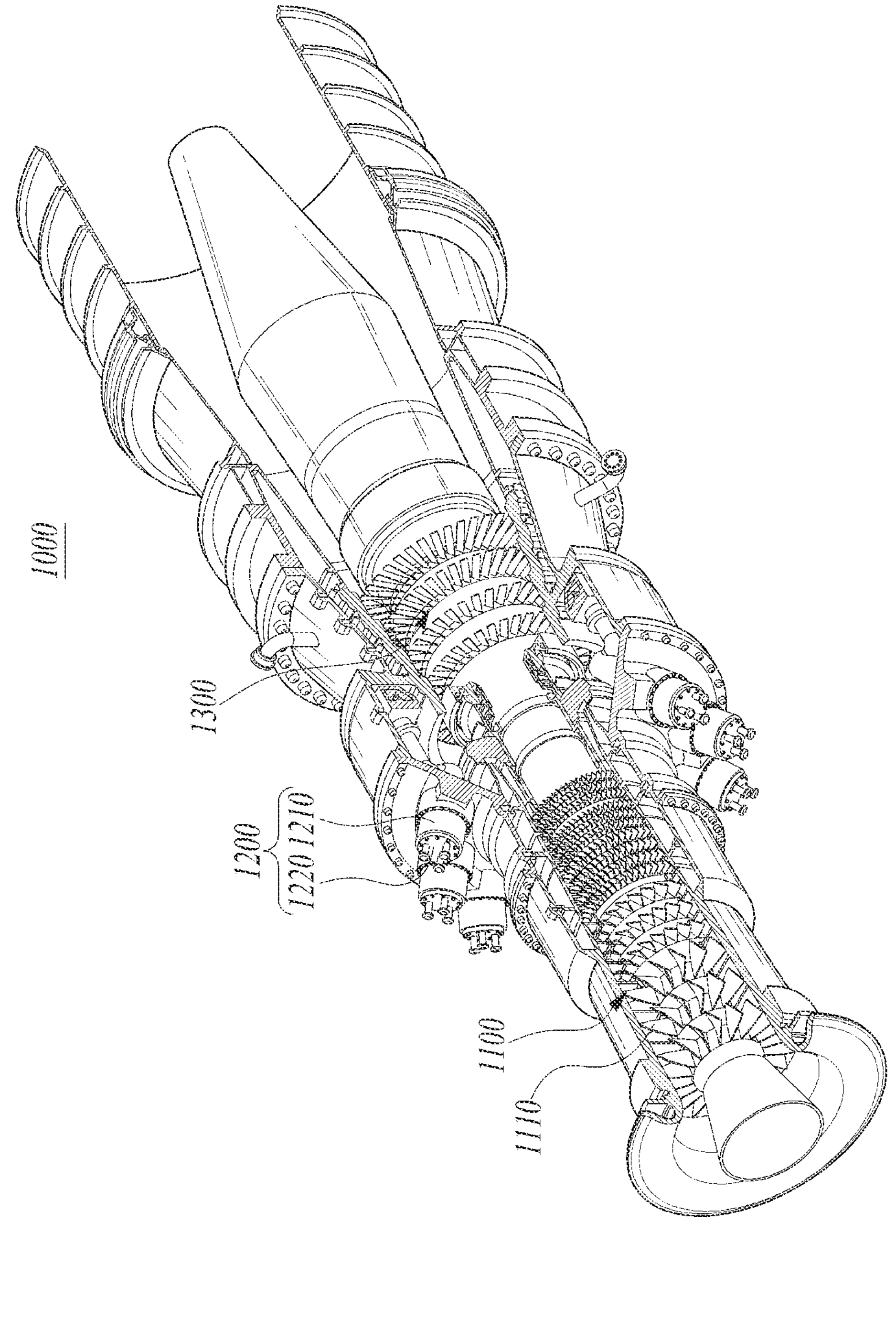
FIG. 1 is a partially cut-away perspective view of a gas turbine according to an embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
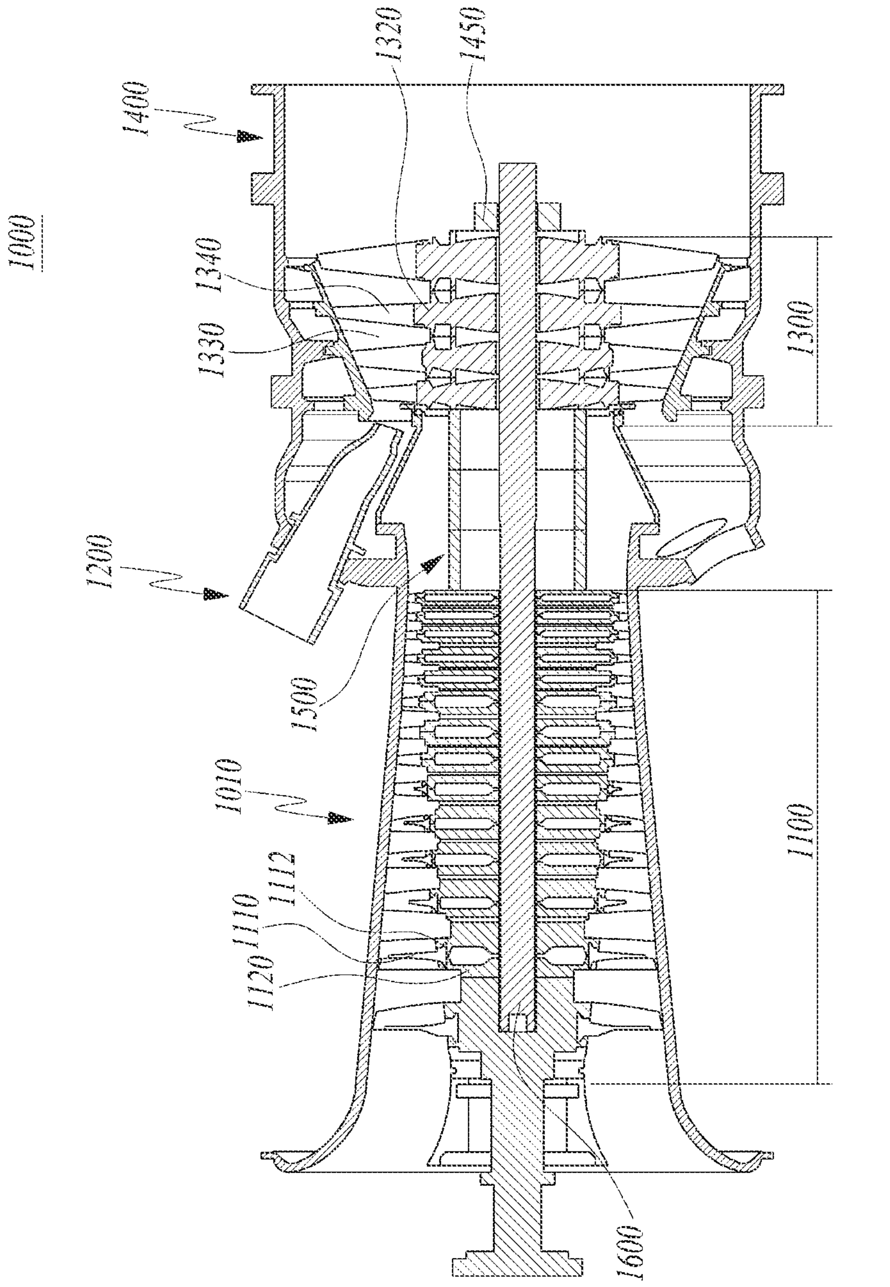
FIG. 2 is a cross-sectional view illustrating a schematic structure of a gas turbine according to an embodiment of the present disclosure.

FIG. 1 is a partially cut-away perspective view of a gas turbine according to an embodiment of the present disclosure, and FIG. 2 is a cross-sectional view illustrating a schematic structure of a gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of blades 1110 radially installed. The compressor 1100 rotates the blade 1110 so that air flows while being compressed by the rotation of the blade 1110. The size and installation angle of the blade 1110 may vary depending on the installation location. In one embodiment, the compressor 1100 is coupled directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor section 1100 is located on the upstream side of the housing 1010, and a turbine section 1300 is located on the downstream side of the housing 1010. A torque tube unit 1500 is disposed as a torque transmission member between the compressor section 1100 and the turbine section 1300 to transmit the rotational torque generated in the turbine section 1300 to the compressor section 1100.

The compressor section 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 are radially coupled to an outer circumferential surface of the compressor rotor disk 1120. Each of the blades 1110 has a dovetail part 1112 which is fastened to the compressor rotor disk 1120.

Vanes (not shown) fixed to the housing 1010 are respectively positioned between the rotor disks 1120. Unlike the rotor disks 1120, the vanes are fixed to the housing 1010 and do not rotate. The vanes serve to align a flow of compressed air that has passed through the blades 1110 of the compressor rotor disks 1120 and guide the air to the blades 1110 of the rotor disks 1120 located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades 1110 to the rotor disk 1120 by using other fasteners such as keys or bolts in addition to the fastening shape.

The tie rod 1600 is arranged to pass through the center of the compressor rotor disks 1120 and turbine rotor disks 1320 such that one end thereof is fastened in the compressor rotor disk 1120 located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-pressure combustion gas. With an combustion process in the combustor, the temperature of the gas is increased up to the heat resistance limit that the combustor and the turbine components can withstand.

The combustor may comprise a plurality of combustors, which are arranged in an annular ring around, and extend through, the housing formed in a cell shape, and each includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The supplied high-temperature and high-pressure combustion gas expands and collides with and provides a reaction force to rotating blades of the turbine to cause a rotational torque, which is then transmitted to the compressor through the torque tube. Here, an excess of power required to drive the compressor is used to drive a generator or the like.

The turbine 1300 is basically similar in structure to the compressor. That is, the turbine 1300 is also provided with a plurality of turbine rotor disks 1320 similar to the compressor rotor disks of the compressor. Thus, the turbine rotor disk 1320 also includes a plurality of turbine blades 1340 disposed radially. The turbine blade 1340 may also be coupled to the turbine rotor disk 1320 in a dovetail coupling manner, for example. Between the blades 1340 of the turbine rotor disk 1320, a turbine vane 1330 fixed to the housing is provided to guide a flow direction of the combustion gas passing through the blades.

The turbine rotor disk 1320 has a substantially disk shape, and a plurality of coupling slots is formed in an outer circumferential portion thereof. The coupling slot has a curved surface in the form of a fir-tree.

The turbine blade 1340 is fastened to the coupling slot. The turbine blade 1340 may have a planar platform part at approximately the center thereof. The platform parts of the neighboring turbine blades abut against each other at lateral sides thereof, thereby serving to maintain the gap between the neighboring blades.

A root part is formed on the bottom surface of the platform part. The root part has an axial-type shape, which is inserted along the axial direction of the rotor disk 1320 into the coupling slot of the rotor disk 1320.

The root part has a substantially fir-shaped curved surface, which is formed to correspond to the shape of the curved surface of the coupling slot. Here, the coupling structure of the root part does not necessarily have a fir shape, but may be formed to have a dovetail shape.

A blade part is formed on an upper surface of the platform part. The blade part is formed to have an airfoil optimized according to the specification of the gas turbine and has a leading edge disposed on the upstream side and a trailing edge disposed on the downstream side with respect to the flow direction of the combustion gas.

Here, unlike the blades of the compressor, the blades of the turbine come into direct contact with the high-temperature and high-pressure combustion gas. Since the temperature of the combustion gas is as high as 1,700° C., a cooling means is required. For this purpose, cooling paths are provided at some positions of the compressor to additionally supply compressed air towards the turbine blades.

The cooling path may extend outside the housing (external path), extend through the interior of the rotor disk (internal path), or both the external and internal paths may be used. A plurality of film cooling holes is formed on the surface of the blade part. The film cooling holes communicate with a cooling path (not shown) formed inside the blade part so as to supply cooling air to the surface of the blade part.

Meanwhile, the blade part of the turbine is rotated by combustion gas in the housing, and a gap exists between the end of the blade part and the inner surface of the housing so that the blade part can rotate smoothly. However, as described above, since the combustion gas may leak through the gap, a sealing means is required to prevent the leakage.

The turbine vane and the turbine blade are both in the form of airfoils and are composed of a leading edge, a trailing edge, a suction surface, and a pressure surface. The interior of the turbine vane and turbine blade contains a complex path structure forming a cooling system. The cooling circuit within the vanes and blades receives cooling fluid, for example air, from the compressor of a turbine engine, and the fluid passes through the ends of the vanes and blades adapted to be coupled to the vanes and blade carriers. The cooling circuit typically includes a plurality of flow paths designed to maintain all sides of the turbine vane and blade at a relatively uniform temperature, and at least a portion of the fluid passing through these cooling circuits is discharged through holes of the leading edge, trailing edge, and the suction surface, and the pressure surface.

In the gas turbine 1000 of the present disclosure, the compressor 1100, the combustor 1200, and the turbine 1300 each have a casing on an outer circumferential side thereof. The casings may be coupled to each other by a plurality of fastening members such as bolts and screws.

Figure 3:
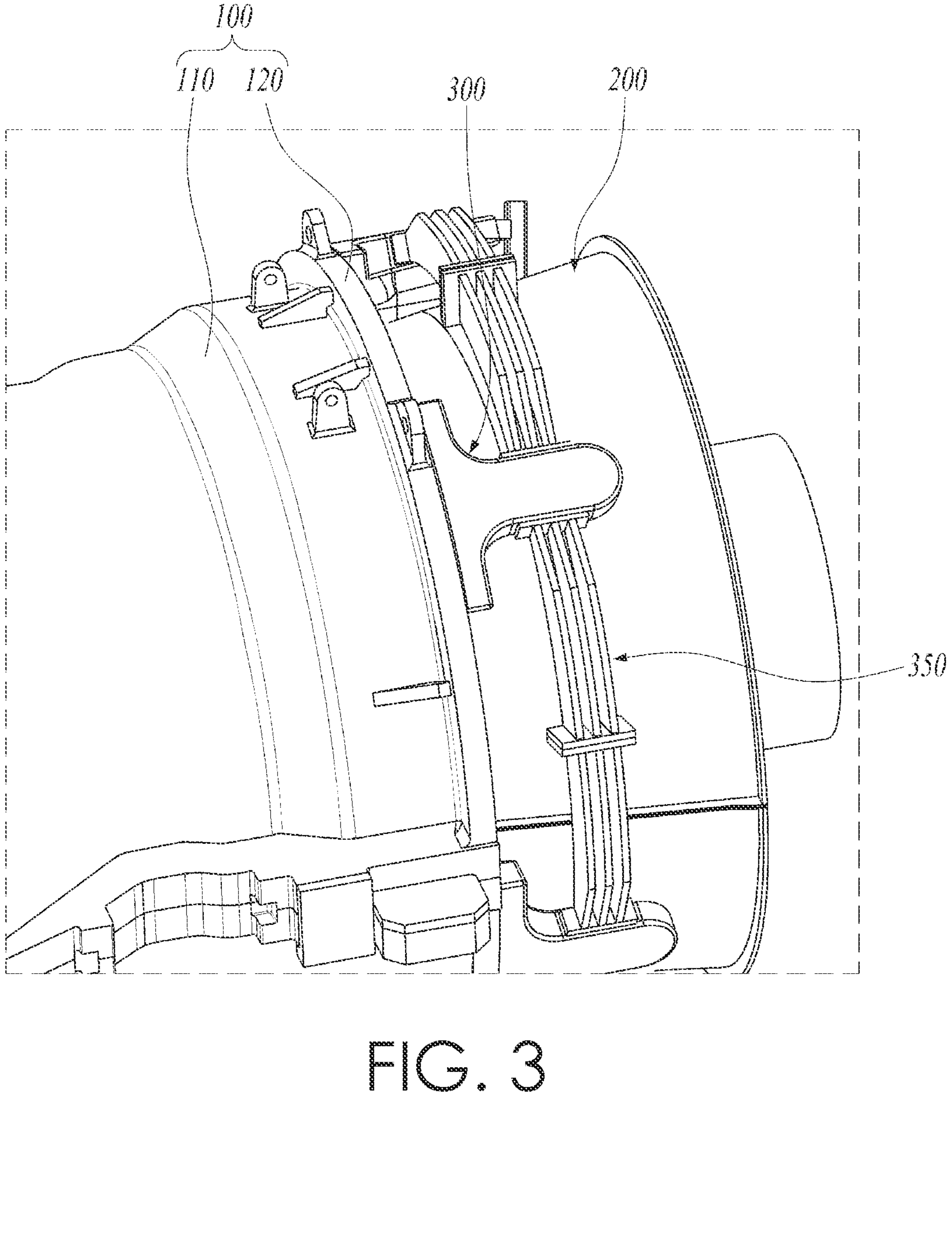
FIG. 3 is a partial perspective view illustrating a vertical joint coupling structure of a casing according to an embodiment of the present disclosure.
Figure 4:
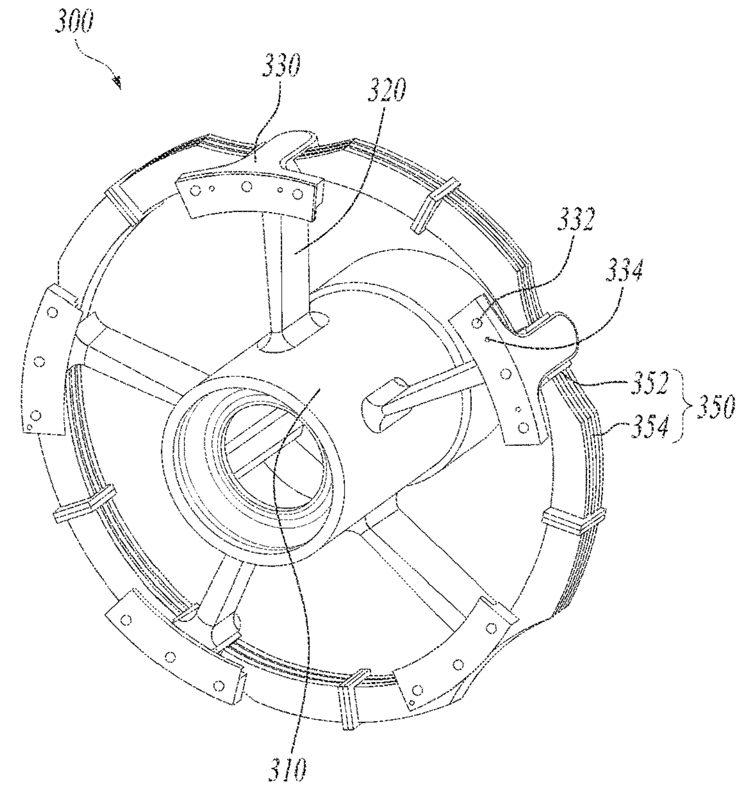
FIG. 4 is a perspective view illustrating a vertical joint according to an embodiment of the present disclosure.
Figure 5:
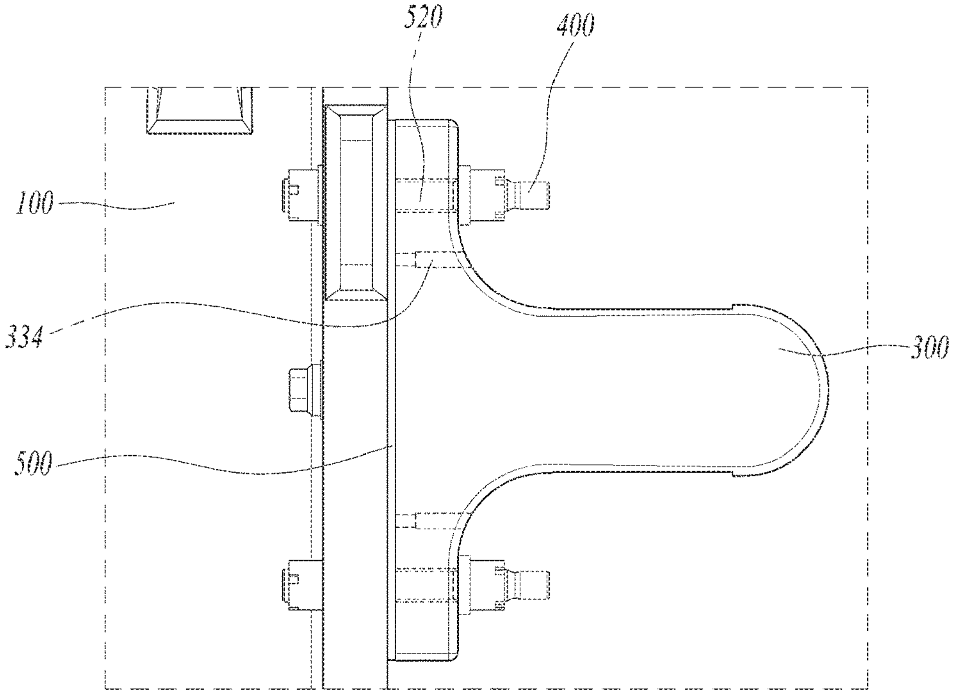
FIG. 5 is a partial perspective view illustrating a coupling structure between a first casing and the vertical joint viewed from the outside in a radial direction according to an embodiment of the present disclosure.
Figure 6:
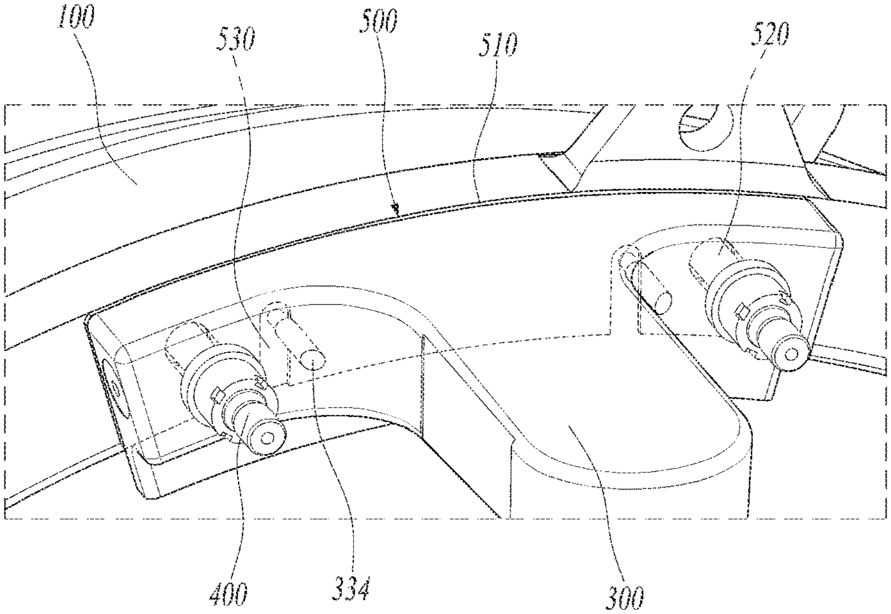
FIG. 6 is a partial perspective view illustrating the coupling structure between the first casing and the vertical joint according to an embodiment of the present disclosure.
Figure 7:
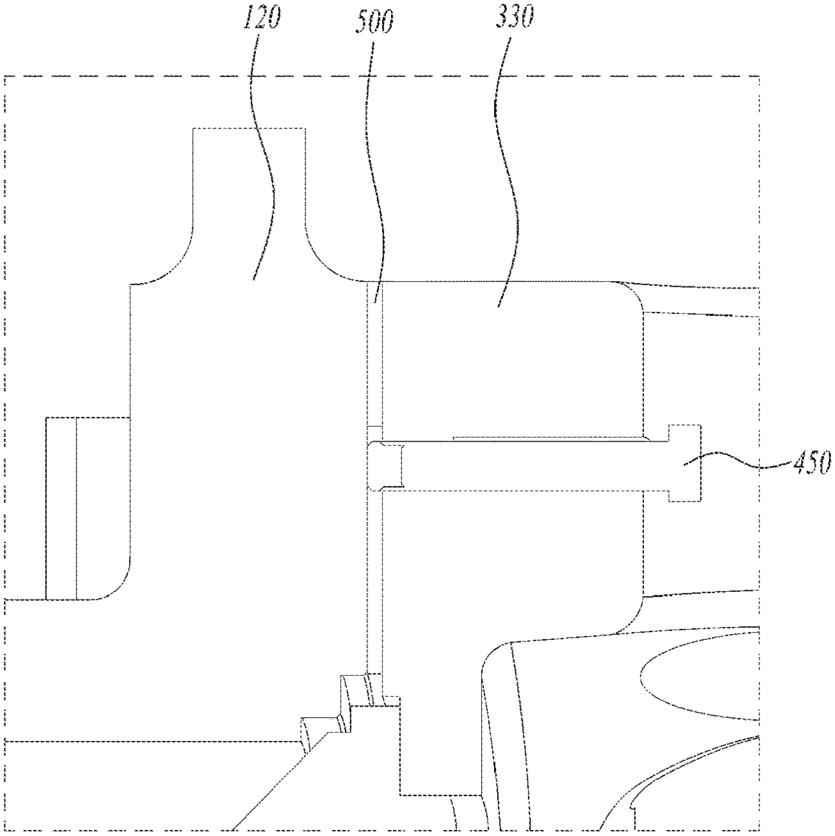
FIG. 7 is a partial cross-sectional view illustrating a configuration for securing a gap between the first casing and a joint part of the vertical joint by fastening a jacking screw according to an embodiment of the present disclosure.

FIG. 3 is a partial perspective view illustrating a vertical joint coupling structure of a casing according to an embodiment of the present disclosure, FIG. 4 is a perspective view illustrating a vertical joint according to an embodiment of the present disclosure, FIG. 5 is a partial perspective view illustrating a coupling structure between a first casing and the vertical joint viewed from the outside in a radial direction, FIG. 6 is a partial perspective view illustrating the coupling structure between the first casing and the vertical joint, and FIG. 7 is a partial cross-sectional view illustrating a configuration for securing a gap between the first casing and a joint part of the vertical joint by fastening a jacking screw.

The vertical joint coupling structure of the casing according to an embodiment of the present disclosure includes a first casing 100 in which combustion gases flow, a second casing 200 connected to the first casing, a vertical joint 300 mounted on the second casing and coupled to the first casing, a plurality of bolt fasteners 400 fastened to the vertical joint and the first casing, a plurality of jacking screws 450 inserted into the vertical joint to secure a gap between the vertical joint and the first casing upon disassembly or assembly between the first casing and the second casing, and a shim member 500 inserted into the gap between the vertical joint and the first casing.

As illustrated in FIGS. 2 and 3, the first casing 100 may be a turbine casing disposed downstream of the turbine 1300. The first casing 100 may include a body part 110 having a circular pipe shape with a variable diameter, and a flange part 120 extending radially from an end of the body part 110. In the first casing 100 formed as a turbine casing, the body part 110 may have a circular pipe shape with a diameter that generally decreases and then increases. The flange part 120 may be formed to extend radially from an outer circumferential surface of a longitudinal end of the body part 110 so that the diameter increases.

The second casing 200 may be a diffuser 1400 connected downstream of the turbine casing. However, the first casing 100 and the second casing 200 are not limited to the turbine casing and the diffuser 1400, so the present disclosure may be applied to a casing coupling structure of other components so long as two adjacent casings are bolt-coupled with a shim member interposed therebetween.

As illustrated in FIGS. 3 and 4, the vertical joint 300 may be mounted on the second casing 200 and coupled to the flange part 120 of the first casing 100. The vertical joint 300 may be mounted to be disposed outside and inside of the second casing 200.

The vertical joint 300 may include a hub part 310 having a cylindrical shape, a plurality of rib connector parts 320 extending radially from an outer circumferential surface of the hub part 310, and a plurality of joint parts 330 integrally formed on distal ends of the rib connector parts 320, respectively, and coupled to the second casing 200.

The cylindrical hub part 310 may be centrally disposed in the diffuser 1400.

The plurality of rib connector parts 320 may be integrally formed with the outer circumferential surface of the hub part 310 so as to extend radially therefrom. Although FIG. 4 illustrates five rib connector parts 320, the number of the rib connector parts 320 is not limited to five, but may be four to six.

The joint parts 330 may be integrally formed with distal ends of the rib connector parts 320, respectively, so as to be bent therefrom. Each of the joint parts 330 may have a substantially 'T' shape when viewed from the outside in a radial direction. In addition, the joint part 330 may have a surface corresponding to an upper surface of the flange part 120 of the first casing 100 on the upstream side in an axial direction.

As illustrated in FIGS. 5 and 6, the plurality of bolt fasteners 400 may be fastened to the vertical joint 300 and the flange part 120 of the first casing 100.

In the bolt fasteners 400, a pair of first bolt fasteners is fastened to the first casing 100 through fastening holes 332 formed in lateral sides of each of the joint parts 330, and a second bolt fastener is fastened to a central portion of each of the joint parts 330 through the first casing 100. The pair of first bolt fasteners each may be composed of a bolt part and a nut part, and the second bolt fastener may be only composed of a hexagonal headed bolt part.

As illustrated in FIG. 7, when disassembling or assembling the first casing 100 and the second casing 200, the plurality of jacking screws 450 may be inserted into the joint parts 330 of the vertical joint 300 to secure a gap between the flange part 120 and the joint part 330 of the vertical joint 300. As illustrated in FIGS. 5 and 6, two jacking screws 450 may be inserted into each joint part 330. The jacking screws 450 may be screwed through screw holes 334 formed through the joint part 330 to allow the joint part 330 to be moved toward or away from the first casing 100. To this end, an inner circumferential surface of the screw hole 334 may be provided with an internal thread that corresponds to an external thread of an outer circumferential surface of the jacking screw 450.

As illustrated in FIGS. 5 and 6, the shim member 500 may be inserted and mounted in the gap between the first casing 100 and the joint part of the vertical joint 300. The shim member 500 may be formed in a substantially rectangular shape with two long sides corresponding to those of the upper surface of the joint part 330. The shim member 500 may be inserted into the gap between the flange part 120 of the first casing 100 and each of the joint parts 330 with the operation of the jacking screws 450 and then fastened thereto. The operation of the jacking screws enables a distance of the joint part 330 of the vertical joint 300 from the flange part 120 of the first casing 100 to increase.

On the other hand, as illustrated in FIG. 4, the vertical joint 300 may further include a plurality of link members 350 disposed on an outer circumferential surface of the second casing 200 and coupled between distal ends of the rib connector parts 320.

The plurality of link members 350 may be connected between distal ends of the rib connector parts 320 to support the vertical joint 300 and the second casing 200.

Each of the link member 350 may include a pair of flange parts 352 respectively fastened to opposite lateral sides of the distal ends of adjacent rib connector parts 320, and a plurality of circumferential rib parts 354 integrally connected between the pair of flange parts.

The flange part 352 may be fastened to opposite lateral sides of the distal ends of adjacent rib connector parts 320 by a plurality of bolts.

The circumferential rib parts 354 may be integrally connected between the pair of flange parts 352. Here, three circumferential rib parts 354 may be integrally connected between the pair of flange parts 352.

Although one link member 350 may be circumferentially coupled between the plurality of rib connector parts 320, as illustrated in FIG. 4, the link member 350 may be segmented into a plurality link sections each having flange parts 352 via which the link segments are fastened to each other by bolts and nuts.

As illustrated in FIG. 6, the shim member may include a plurality of through holes 520 through which the bolt fasteners 400 pass, and a plurality of screw slots 530 extending from an edge thereof so that the jacking screws 450 pass therethrough.

A main body plate 510 of the shim member 500 may be formed in a substantially rectangular shape with two long sides corresponding to those of the upper surface of the flange part 120. The main body plate 510 may be formed to have a constant thickness, and may have three through holes 520 and two screw slots 530 formed therein.

The through holes 520 may be circular holes that are formed near both lateral sides and a central portion of the plane of the main body plate 510.

The screw slots 530 may be formed in the main body plate 510 between the three through holes 520 by being cut outwardly from an inner edge in the radial direction of the body plate 510. Depending on the shape of the screw slot 530, the shim member 500 can be inserted or removed without interference even when the jacking screw 450 is fastened.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure.

What is claimed is:

1. A vertical joint coupling structure comprising:
- a first casing in which combustion gases flow;
- a second casing connected to the first casing;
- a vertical joint mounted on the second casing and coupled to the first casing;
- a plurality of bolt fasteners fastened to the vertical joint and the first casing;
- a plurality of jacking screws inserted into the vertical joint to secure a gap between the vertical joint and the first casing upon disassembly or assembly between the first casing and the second casing; and
- a shim member inserted into the gap between the vertical joint and the first casing,
- wherein the first casing comprises:
  - a body part having a circular pipe shape with a variable diameter;
  - and
  - a flange part extending radially from an end of the body part,
- wherein the vertical joint comprises:
  - a hub part having a cylindrical shape;
  - a plurality of rib connector parts extending radially from an outer circumferential surface of the hub part; and
  - a plurality of joint parts integrally formed on distal ends of the rib connector parts, respectively, and coupled to the second casing,
- wherein the shim member is formed in a substantially rectangular shape with two long sides corresponding to those of an upper surface of the flange part, and the shim member is inserted and mounted between one side of the flange part and the joint parts,
- wherein the shim member comprises:
  - a plurality of through holes through which the bolt fasteners pass; and
  - a plurality of screw slots extending from an edge thereof so that the jacking screws pass therethrough, and
- wherein the plurality of jacking screws are screwed through screw holes formed through the joint parts to allow the joint parts to be moved toward or away from the first casing.

2. The vertical joint coupling structure according to claim 1, wherein the vertical joint further comprises a plurality of link members disposed on an outer circumferential surface of the second casing and coupled between distal ends of the rib connector parts.

3. The vertical joint coupling structure according to claim 2, wherein each link member of the plurality of link members comprises:
- a pair of flange parts respectively fastened to opposite lateral sides of the distal ends of adjacent rib connector parts; and
- a plurality of circumferential rib parts integrally connected between the pair of flange parts.

4. The vertical joint coupling structure according to claim 1, wherein the first casing is a turbine casing disposed downstream of a turbine, and the second casing is a diffuser.

5. A gas turbine comprising:
- a compressor configured for suctioning and compressing external air;
- a combustor configured for mixing fuel with compressed air and combusting an air-fuel mixture; and
- a turbine rotated by combustion gases discharged from the combustor, the turbine comprising:
- a first casing in which combustion gases flow;

a second casing connected to the first casing;

a vertical joint mounted on the second casing and coupled to the first casing;

a plurality of bolt fasteners fastened to the vertical joint and the first casing;

a plurality of jacking screws inserted into the vertical joint to secure a gap between the vertical joint and the first casing upon disassembly or assembly between the first casing and the second casing; and a shim member inserted into the gap between the vertical joint and the first casing, wherein the first casing comprises:

a body part having a circular pipe shape with a variable diameter; and a flange part extending radially from an end of the body part, wherein the vertical joint comprises:

a hub part having a cylindrical shape;

a plurality of rib connector parts extending radially from an outer circumferential surface of the hub part; and a plurality of joint parts integrally formed on distal ends of the rib connector parts, respectively, and coupled to the second casing, wherein the shim member is formed in a substantially rectangular shape with two long sides corresponding to those of an upper surface of the flange part, and the shim member is inserted and mounted between one side of the flange part and the joint parts, wherein the shim member comprises:

a plurality of through holes through which the bolt fasteners pass; and a plurality of screw slots extending from an edge thereof so that the jacking screws pass therethrough, and wherein the plurality of jacking screws are screwed through screw holes formed through the joint parts to allow the joint parts to be moved toward or away from the first casing.

6. The gas turbine according to claim 5, wherein the vertical joint further comprises a plurality of link members disposed on an outer circumferential surface of the second casing and coupled between distal ends of the rib connector parts.

7. The gas turbine according to claim 6, wherein each link member of the plurality of link members comprises:

a pair of flange parts respectively fastened to opposite lateral sides of the distal ends of adjacent rib connector parts; and a plurality of circumferential rib parts integrally connected between the pair of flange parts.

8. The gas turbine according to claim 5, wherein the first casing is a turbine casing disposed downstream of a turbine, and the second casing is a diffuser.

* * * * *